United States Patent [19]
Sieber

[11] 3,866,561
[45] Feb. 18, 1975

[54] SELF-DEPLOYING VARIABLE FLOAT PENDANT

[75] Inventor: Charles W. Sieber, Sterling, Va.

[73] Assignee: The United States of America as represented by the Secretary of the Navy, Washington, D.C.

[22] Filed: Sept. 25, 1973

[21] Appl. No.: 398,278

[52] U.S. Cl. .......................... 114/235 B, 242/128
[51] Int. Cl. .................... B63b 21/56, B65h 49/00
[58] Field of Search ......... 9/8 R; 114/235 R, 235 A, 114/235 B, 235 F, 221 R, 221 A; 242/128, 86.7, 86.5, 77

[56] References Cited
UNITED STATES PATENTS

| | | | |
|---|---|---|---|
| 2,524,863 | 10/1950 | White | 114/235 B |
| 2,564,228 | 8/1951 | Pitney | 242/77 |
| 2,987,029 | 6/1961 | Manuel | 114/235 B |
| 3,162,870 | 12/1964 | Laird | 9/8 R |
| 3,336,892 | 8/1967 | Barry et al. | 9/8 R |
| 3,351,158 | 11/1967 | Kite | 242/128 |
| 3,402,687 | 9/1968 | Tsuji | 9/8 R |
| 3,469,551 | 9/1969 | Lefebvre | 114/235 B |

*Primary Examiner*—Benjamin A. Borchelt
*Assistant Examiner*—C. T. Jordan
*Attorney, Agent, or Firm*—R. S. Sciascia; Q. E. Hodges

[57] ABSTRACT

A self-deploying pendant for use in minesweeping apparatus between the paravane and the float that is maintained short at launch to avoid entanglement but self-deploys to a predetermined length when launched into the water. The predetermined length may be adjusted immediately before launch of the minesweeping gear to place the cable or paravane at the desired sweep depth.

4 Claims, 2 Drawing Figures

PATENTED FEB 18 1975 3,866,561

SELF-DEPLOYING VARIABLE FLOAT PENDANT

BACKGROUND OF THE INVENTION:

The instant invention relates generally to minesweeping apparatus and more particularly to a pendant that self-deploys to a predetermined length.

In minesweeping operations, particularly when performed by an aircraft such as a helicopter, the deployment of all the gear including a cutting cable, a plurality of paravanes, and a plurality of floats is a difficult enough procedure without having to be concerned with the entanglement of the various components due to the pendant cables being deployed to full length. Furthermore if the components become entangled, the minesweeping mission will not be a success. Even when such minesweeping gear is launched from a ship, there is likelihood of the components being tangled together in the cable and pendants and the gear must be retrieved and redeployed.

An additional problem with the typical minesweeping gear using standard stock paravane-to-float pendants is that the pendants are not readily adjustable and the sweep depth must be anticipated. If a shorter or longer length is desired, the pendant must be changed. This problem necessitates the stocking of various length pendants and requires aboard a ship substantial rigging work just prior to the launching to select and attach the pendants for the desired sweep depth. In the case of an aircraft minesweeping mission, selection of the sweep depth must be made prior to the system being rigged into the aircraft and cannot afterward be changed. This reduces mission flexibility because it is necessary to know the desired sweep depth before take-off; since it is not feasible to change the pendants in flight. To change them the aircraft would have to return to base because weight limitations and working space precludes stowage of addition pendants and change in flight.

OBJECTS OF THE INVENTION:

Accordingly, an object of the present invention is to provide a new and improved pendant for minesweeping operations.

Another object of the instant invention is to provide a paravane-to-float pendant that is convenient to launch and deploy from an aircraft.

Still another object of the present invention is to provide a pendant that will not tangle with the minesweeping gear during launch.

A further object of the present invention is to provide a variable length pendant that may be adjusted for anticipated minesweeping depth.

A still further object of the present invention is to provide a self-deploying pendant for minesweeping operations.

A still further object of the instant invention is to provide a simple and efficient variable cable unwinding system.

SUMMARY OF THE INVENTION:

Briefly, these and other objects of the present invention are attained by the use of a pendant wound on a spool attached to the minesweeping float or paravane. The spool has a threaded hub which threadably engages a threaded spindle shaft. A shear pin detent releasably secures the spool with the pendant wound up short. A lock nut, adjustable along the threaded spindle, forms a positive stop or detent to the spool as it rotates and progresses along the spindle to stop the payout of the pendant at a desired length.

BRIEF DESCRIPTION OF THE DRAWINGS:

A more complete understanding of the invention and many of the attendant advantages thereof will be readily appreciated as the same become better understood by reference to the following detailed description when considered in connection with the accompanying drawings wherein.

Figures 1, 2:
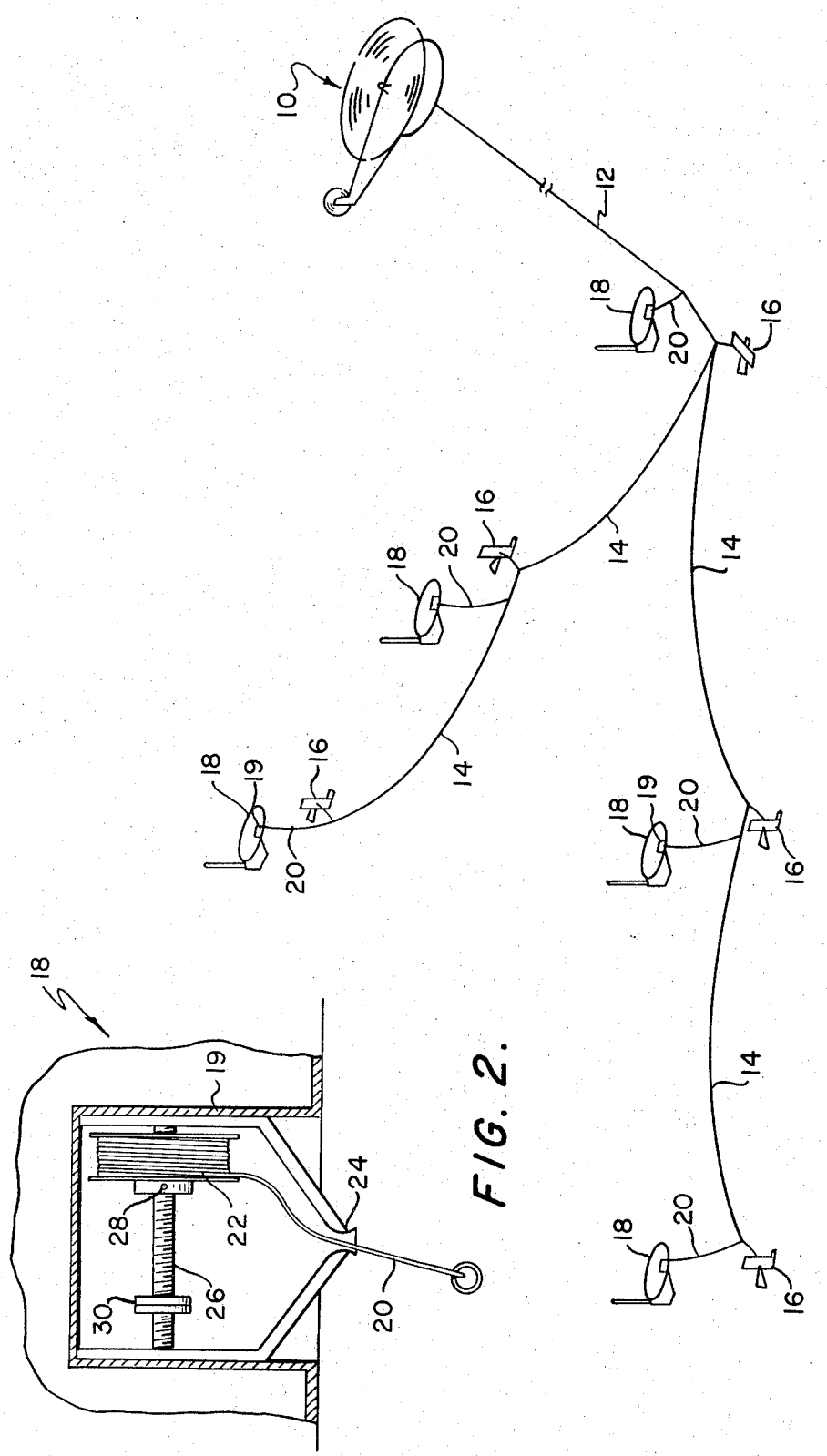
FIG. 1 is a pictorial view of a minesweeping operation by a holicopter showing a deployed float pendant.
FIG. 2 is a detailed pictorial view, partially cut away of the self-deploying variable length pendant and adjustable spool system, mounted in a float, according to the instant invention.

DESCRIPTION OF THE PREFERRED EMBODIMENT:

Referring now to the drawings, wherein like reference numerals designate corresponding parts throughout the several views, there is shown generally in FIG. 1, an aircraft such as a helicopter 10, above a body of water towing a cable 12 which is bifurcated to a starboard and a port sweep cable 14.

Attached to the sweep cable 14 are a plurality of paravanes 16, the first one nearest the helicopter 10 referred to as a cable depressor, and the after ones as otters, used for spreading out the starboard and port bifurcations of the sweep cable 14. Each depressor and otter has associated therewith a float 18 used as a visual marker and particularly to maintain the paravane at a predetermined depth below the surface. Attaching the float 18 to the paravane 16 is a pendant 20 acccording to the instant invention. The pendant 20 is directly attached to a pendant unwinding mechanism 19 contained with each float.

Referring now to FIG. 2 the details of the pendant unwinding mechanism 19 are shown in the lower portion of the float 18 and including the pendant 20 would on a spool 22. For smooth payout and constant effective towpoint location the pendant is fed through a fairlead 24 at the bottom of the float. It is to be understood however, that the unwinding mechanism may be affixed to the paravane 16 with equal advantage.

Spool 22 has a threaded hub that is threadably engaged with a threaded axle or spindle 26 secured at both ends in the float body 18. Releasably holding the spool 22 from rotation and therefore from linear translation along the spindle 26 is a shear pin 28, made of nylon, lead, aluminum or the like that has a predictably low shear strength, snugly fit in a cross hole bored through the spindle 26. This shear pin thereby precludes the paying out of the pendant 20 until sufficient tension causes the shear pin to shear. On the threaded spindle 26 and spaced from the spool 22, at preselectable distances is a lock-nut 30 forming a positive stop or detent to the linear translation and therefore the rotation of the spool 22, which of course stops the pay out of the pendant 20. Locknut 30 may be one having an "upset" internal thread which grips the spindle relatively tightly so it may be adjusted by a wrench but not moved by the spindle engagement, or a pair of nuts tightly wrenched together. In any event locknut 30 is adjustable along the threaded spindle 26 so that the final payed out length of the pendant 20 may be preselected for a predetermined sweep depth.

The operation of the self-deploying variable length float pendant greatly simplifies the preparation and launch of minesweeping gear particularly from a helicopter. The mechanism is rigged by winding the pendant 20 onto the spool 22 by rotating the spool. As the spool rotates it translates along the threaded spindle, to the right as shown in FIG. 2, and the shear pin 28 is then installed to stop further rotation. Only sufficient pendant length extends from the fairlead to allow later attachment to the paravane 16. Prior to deployment, the desired length of pendant is determined, and the locknut 30 is preset to permit sufficient rotation of the spool 22 to pay out the predetermined length of pendant. If a change in pendant length is desired, even after rigging the gear into the helicopter, the position of the locknut 30 may be readily changed.

When the minesweeping gear is deployed into the water, the tow cable 14 and paravanes 16 sink and stretch out behind the helicopter, and the floats stay on the surface. This places sufficient tension on the pendant to cause the shear pin to shear and allow the spool to rotate. The spool rotates on the threaded spindle 26 until its hub comes into contact with the positive stop nut 30, at which time the predetermined length of pendant 20 has been payed out.

Obviously many modifications and variations of the present invention are possible in light of the above teachings. It is therefore to be understood that within the scope of the appended claims, the invention may be practiced otherwise than as specifically described.

What is claimed Is:

1. A self-deploying variable length float pendant and unwinding system for minesweeping gear, comprising:
    a pendant of flexible cable material for connecting a minesweeping paravane and float;
    a spindle affixed in said float;
    a spool attached for rotation on said spindle, and having wound thereon a length of said pendant;
    a releasable detent connecting said spool to said spindle; and
    a positive detent stop on said spindle for terminating the rotation of said spool when a desired length of pendant has been payed out.

2. The self-deploying variable length pendant and unwinding system of claim 1, wherein:
    said spindle is threaded; and
    said spool is threadably engaged with said threaded spindle.

3. The self-deploying variable length pendant and unwinding system of claim 2, wherein:
    said releasable detent is a shear pin having a predetermined shear strength and engaged through said spindle;
    and said positive detent stop is a locknut threadably engaged on and adjustable along said threaded spindle;
    whereby said shear pin shears when the paravane sinks away from the float, and said locknut stops the payout of said pendant to a predetermined length.

4. The self-deploying variable length pendant and unwinding system of claim 3, further comprising:
    a fairlead surrounding said pendant adjacent said spool.

* * * * *